US010842077B2

(12) United States Patent
Daudre et al.

(10) Patent No.: US 10,842,077 B2
(45) Date of Patent: Nov. 24, 2020

(54) VERGE-CUTTING MOWER DEVICE COMPRISING A PIECE OF CUTTING/GRINDING EQUIPMENT ACTUATED USING AN ELECTRIC MOTOR

(71) Applicant: ROUSSEAU, Neuville-sur-Saone (FR)

(72) Inventors: Guillaume Daudre, Saint Didier au Mont d'Or (FR); Mathieu Courtine, Le Havre (FR)

(73) Assignee: ROUSSEAU (FR)

( * ) Notice: Subject to any disclaimer, the term of this patent is extended or adjusted under 35 U.S.C. 154(b) by 41 days.

(21) Appl. No.: 16/309,257

(22) PCT Filed: Jun. 21, 2017

(86) PCT No.: PCT/FR2017/051647
§ 371 (c)(1),
(2) Date: Dec. 12, 2018

(87) PCT Pub. No.: WO2018/024952
PCT Pub. Date: Feb. 8, 2018

(65) Prior Publication Data
US 2019/0124845 A1    May 2, 2019

(30) Foreign Application Priority Data
Aug. 2, 2016  (FR) ..................................... 16 57505

(51) Int. Cl.
*A01D 34/86*  (2006.01)
*A01D 34/58*  (2006.01)
(Continued)

(52) U.S. Cl.
CPC ............. *A01D 69/02* (2013.01); *A01D 34/58* (2013.01); *A01D 34/8355* (2013.01);
(Continued)

(58) Field of Classification Search
CPC .. A01D 34/8355; A01D 34/86; A01D 34/866; A01D 34/58; A01D 34/64;
(Continued)

(56) References Cited

U.S. PATENT DOCUMENTS 3,032,956 A    5/1962  Mullet
3,085,385 A    4/1963  Hansen et al.
(Continued)

FOREIGN PATENT DOCUMENTS

GB    2 475 332    5/2011
WO    97/28681    8/1997

OTHER PUBLICATIONS

International Search Report of dated Oct. 6, 2017.

*Primary Examiner* — Robert E Pezzuto
(74) *Attorney, Agent, or Firm* — Gerald E. Hespos; Michael J. Porco; Matthew T. Hespos

(57) ABSTRACT

A verge-cutting mower device (20, 30), for example for maintaining roadside verges, has at least one frame (16) intended to be mounted on an automotive agricultural machine (10) and on which there is mounted a piece of cutting/grinding equipment (20) intended to mow or grind plants. The cutting/grinding equipment (20) is actuated using an electric motor (33).

11 Claims, 4 Drawing Sheets

(51) Int. Cl.
  *A01D 69/02*   (2006.01)
  *A01D 34/835*  (2006.01)
  *H02K 9/19*    (2006.01)
  *H02K 51/00*   (2006.01)
  *A01D 101/00*  (2006.01)

(52) U.S. Cl.
  CPC .............. *A01D 34/86* (2013.01); *H02K 9/19* (2013.01); *H02K 51/00* (2013.01); *A01D 2101/00* (2013.01)

(58) Field of Classification Search
  CPC ........ A01D 69/02; A01G 3/0426; H02K 9/19; H02K 51/00
  USPC ............ 56/13.8, 15.5, 16.7, 10.7, 15.2, 11.9, 56/13.6; 30/379
  See application file for complete search history.

(56) References Cited

U.S. PATENT DOCUMENTS

| | | | | |
|---|---|---|---|---|
| 4,426,829 | A | * | 1/1984 | Johnson ............... A01D 34/866 56/10.4 |
| 4,873,818 | A | * | 10/1989 | Turner ................ A01D 34/866 56/10.8 |
| 4,949,534 | A | * | 8/1990 | Evans .................... A01D 34/64 56/13.8 |
| 6,149,478 | A | * | 11/2000 | Lehmann ................... B63J 3/02 440/88 R |
| 6,487,837 | B1 | | 12/2002 | Fillman et al. |
| 8,760,127 | B2 | * | 6/2014 | Sridharan ............... H02K 9/24 322/33 |
| 2008/0264026 | A1 | | 10/2008 | Ishii et al. |
| 2009/0188225 | A1 | | 7/2009 | Harris |
| 2012/0112568 | A1 | | 5/2012 | Chamberlin et al. |

* cited by examiner

VERGE-CUTTING MOWER DEVICE COMPRISING A PIECE OF CUTTING/GRINDING EQUIPMENT ACTUATED USING AN ELECTRIC MOTOR

BACKGROUND

Field of the Invention

The present invention relates to a verge-cutting mower device, for example for the upkeep of roadsides, and to an automotive agricultural machine provided with a device of this type.

Related Art

The agricultural machines which are used to mow roadsides or clear them of undergrowth, in particular motorway embankments, in general comprise at least a chassis fitted on wheels, a cab, a rear and/or front power take-off, and a piece of equipment which is designed for mowing or grinding of plants. Depending on the type of agricultural machine or use, this piece of equipment is fitted on the side of the chassis, at the front or at the rear, and comprises for example a pivoting arm which is articulated such as to be able to extend, supporting a piece of cutting/grinding equipment such as an undergrowth-clearing head or a branch-cutter bar. Habitually, the piece of cutting/grinding equipment is put into action (rotation of cutting tools) by means of a motor of the hydraulic type.

However, this type of device does not give complete satisfaction. In fact, the hydraulic motors used create pollution, they are difficult to cool, and complex to maintain.

An objective of the present invention is thus to resolve the aforementioned problems by means of a solution which is simple to implement and maintain, which creates very little pollution, is reliable, compact, provides maximum instantaneously usable power, and has excellent performance.

For this purpose, the invention relates to a verge-cutting mower device, for example for the upkeep of roadsides, comprising at least one frame which is designed to be fitted on an automotive agricultural machine, and on which there is fitted a piece of cutting/grinding equipment designed to mow or grind plants, actuated by means of a motor, characterized in that said motor is electric.

SUMMARY

According to preferred embodiments of the present invention:
- the electric motor is connected to a current generator in order to provide it with the electrical energy it needs;
- the current generator is fitted on the frame, and is connected to a power take-off of an agricultural machine by means of a multiplier;
- the current generator is on the exterior of the device, and is disposed in an automotive agricultural machine;
- the current generator produces several tens of kilowatts, for example between approximately 15 kW and 50 kW, and advantageously approximately 25 to 40 kW;
- a variator is disposed between the current generator and the electric motor of the piece of cutting/grinding equipment;
- one or a plurality of the elements from amongst the current generator, the electric motor and the variator is/are cooled;
- the cooling is carried out by means of a coolant fluid, which is advantageously biodegradable;
- the cooling is carried out by means of a glycolated fluid circuit and a cooler, for example of the air/glycolated water type; and
- the electric motor is implanted directly on the piece of cutting/grinding equipment.

The invention also relates to an agricultural machine of the automotive type for the upkeep of roadsides, comprising a mowing device as previously described.

The invention will now be described in greater detail with reference to particular embodiments provided purely by way of illustration.

DETAILED DESCRIPTION

Figure 1:
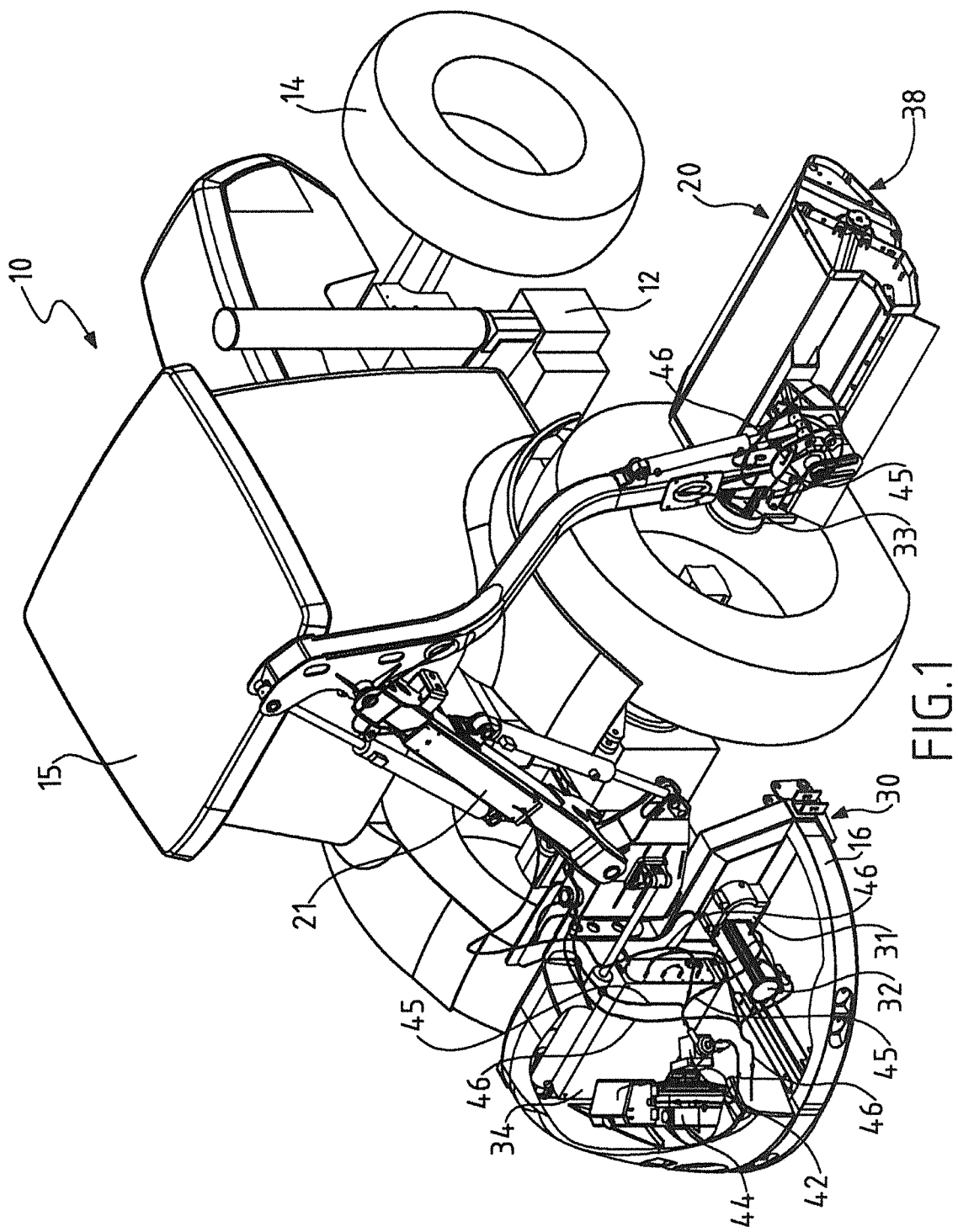
FIG. 1 is a view in isometric perspective of an agricultural machine according to the present invention.
Figure 2:
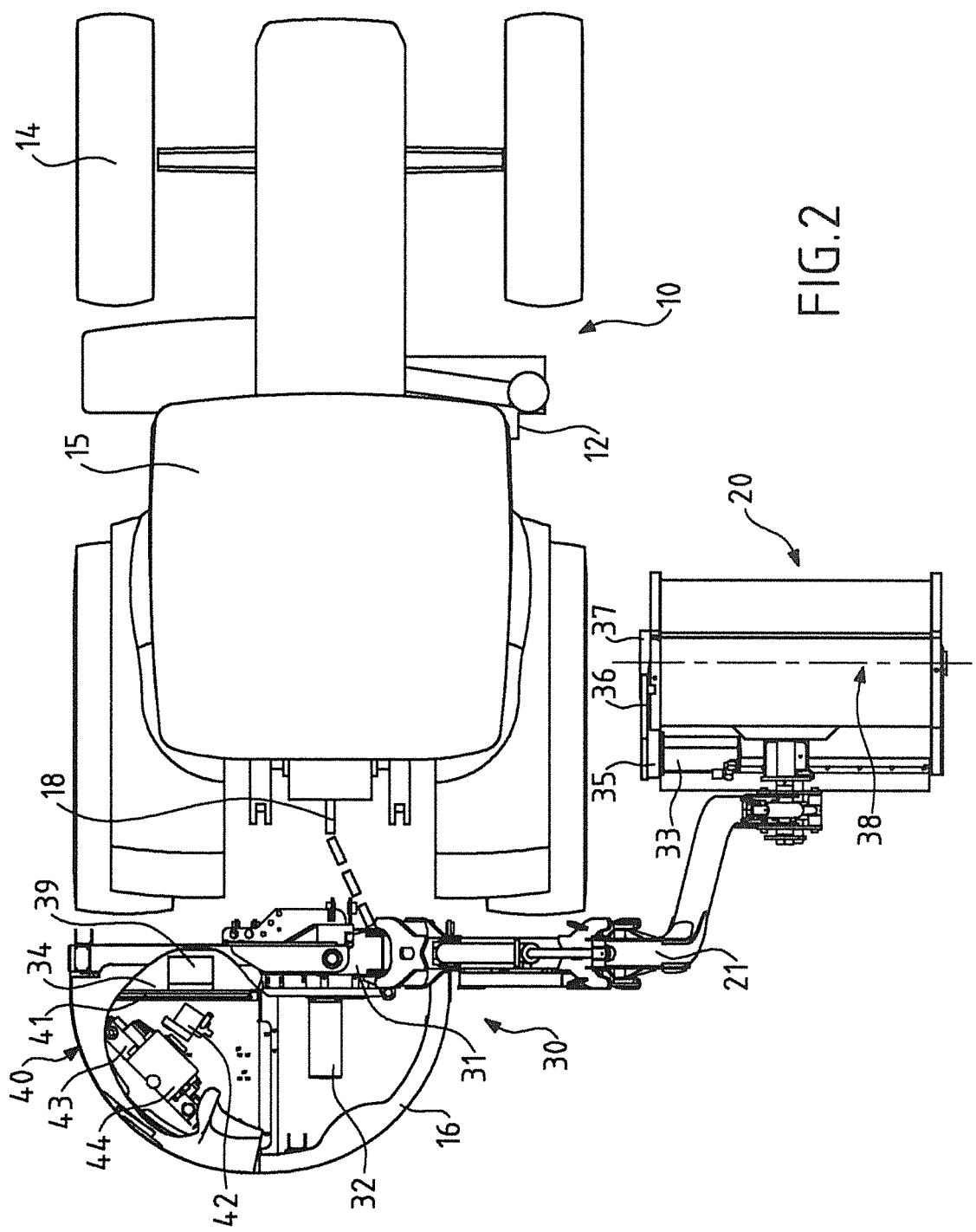
FIG. 2 is a view from above of FIG. 1.

FIGS. 1 and 2 represent an automotive agricultural machine 10, such as a tractor, comprising globally a chassis 12, wheels 14, a cab 15, a rear frame 16, a rear rotary power take-off (schematized in FIG. 4) and a piece of cutting/grinding equipment 20 fitted on a mobile/articulated arm 21.

The machine 10 also comprises a system 30 for controlling and driving the cutting/grinding equipment 20 which more specifically is the subject of the present invention.

Figure 4:
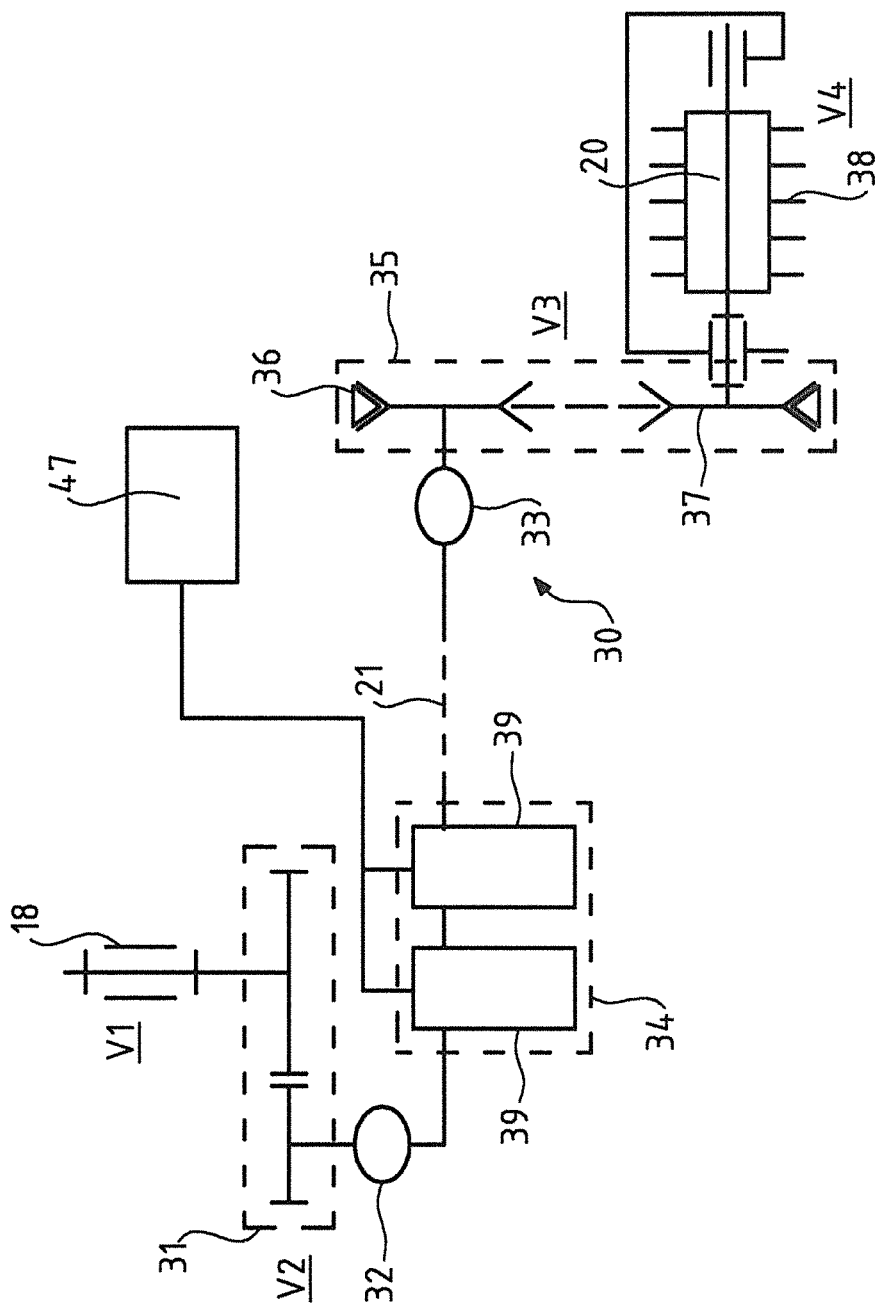
FIG. 4 is a schematic view of the mowing device.

As can be seen in the diagram in FIG. 4, this system 30 is connected to the rear power take-off 18, which is common to most agricultural machines such as tractors. This power take-off 18 is habitually rotated by the thermal engine of the tractor 10, and is used to drive various accessories of a known type, in particular mowing tools.

In the present case, the power take-off 18 drives a multiplier 31 which is designed to multiply the input speed of rotation V1 of approximately 500 to 1000 rpm, in order to obtain an output speed V2 of approximately 2500 to 5000 rpm.

The multiplier 31 is connected at its output to the input of the current generator 32 which provides output electric power of approximately 15 to 50 kW, for example between 25 and 40 kW.

The electric generator 32 is then connected to an electric motor 33 by means of cables and an electrical control box 34 comprising at least one variator 39.

A man-machine interface 47, which is typically disposed in the cab 15, allows an operator to control the mowing device.

The electric motor 33 provides output electric power of approximately 15 to 50 kW, for example 25 to 40 kW. This electric motor 33, implanted directly on the cutting/grinding equipment 20, is connected at its output to a drive system comprising for example a drive pulley 35 which drives a driven pulley 37 by means of a drive belt 36. At the output of the electric motor 33, the belt 36 can for example rotate at a speed V3 of 3000 to 4500 rpm, whereas the cutting/grinding equipment 20 and the cutting tools 38 rotate at a speed V4 of 2000 to 3000 rpm thanks to a reduction means. The reduction means can be provided by a difference between the diameters of the pulleys 35 and 37.

The rear frame 16 of the agricultural machine 10 also supports means 40 for cooling one or a plurality of the elements from amongst the current generator 32, the electric motor 33 and the variator 39. If needed, the cooling means 40 could also make it possible to cool other elements.

Figure 3:
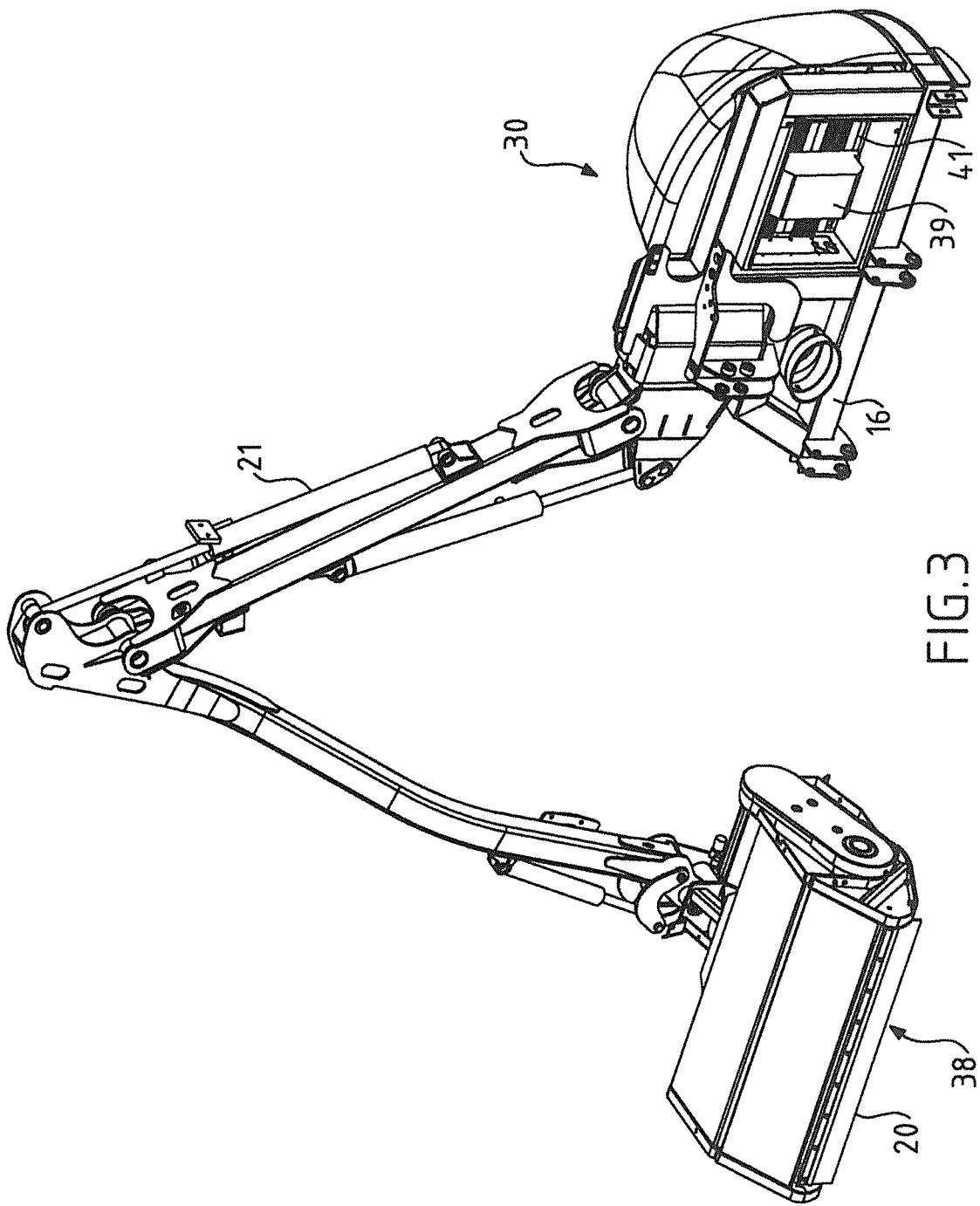
FIG. 3 is a detailed view in isometric perspective of FIG. 1 showing a mowing device of the agricultural machine.

These cooling means 40, illustrated schematically in FIGS. 2 and 3, comprise a solid/glycolated water heat exchanger 41, a glycolated water pump 42, a cooler 43, an expansion vessel 44 containing said glycolated water, and cold 45 and hot 46 liquid input/output ducts for the elements to be cooled.

The operation of the device 30 for controlling and driving the cutting/grinding equipment 20 is extremely simple and reliable, since it is the power take-off 18 which generates the production of electricity by means of the generator 32, in order to supply the motor 33 with current.

This solution makes it possible to reduce the weight and size of the agricultural machine 10 in comparison with the prior art, in particular the weight and size of the piece of cutting/grinding equipment 20 and its control and drive system 30. The use of an electric motor 33 accompanied by its current generator 32 makes it possible to reduce significantly the noise and pollution generated by the control system and the piece of equipment, whilst providing torque which is identical or greater, and is available very rapidly. The use of electric technology also makes it possible to create a flexible link between the power take-off 18 and the cutting/grinding equipment 20. It is easy to provide regulation and/or control making it possible to propose easy adjustment of the speed of rotation of the cutting tools 38, independently from the speed of rotation of the power take-off 18. This provides flexibility of use, improved ergonomics, great reliability, and excellent performance, whilst permitting energy savings.

It must be appreciated that the detailed description of the subject of the invention, which is provided purely by way of illustration, does not constitute in any way a limitation, and equivalent techniques are also included in the field of the present invention.

Thus, as an alternative, the cooling means 40 can comprise a pipe coil fluid/air cooler in place of the air/glycolated water cooler 43. The coolant fluid is advantageously biodegradable.

The generator 32 can be fitted directly on the agricultural machine 10, which makes it possible in particular to dispense with use of the power take-off 18 and the multiplier 31.

The invention claimed is:

1. A verge-cutting mower device (20, 30), for upkeep of roadsides, comprising at least one frame (16) which is designed to be fitted on an automotive agricultural machine (10), and on which there is fitted a piece of cutting/grinding equipment (20) designed to mow or grind plants, actuated by means of a motor (33), is electric, connected to a current generator (32) in order to provide the cutting/grinding equipment with electrical energy, and comprising:
   at least one variator (39) integrated in an electrical circuit, comprising the current generator (32) and the electric motor (33) of the piece of cutting/grinding equipment (20), wherein
   the cutting/grinding equipment (20) is connected to the at least one frame (16) by an articulated arm (21),
   the current generate (32) is fitted on the at least one frame (16), and is connected to a power take-off (18) of an agricultural machine by means of a multiplier (31),
   the electric motor (33) is implanted directly on the cutting/grinding equipment (20),
   the electric motor (33) drives the cutting/grinding equipment (20) via a drive system comprising a drive pulley (35) which drives a driven pulley (37) by means of a drive belt (36),
   the variator (39) is disposed between the current generator (32) and the electric motor (33), and
   the verge-cutting mower device comprises means (40) for cooling at least one of the current generator (32), the electric motor (33), and the variator (39) with a cooling fluid, the means for cooling comprising an exchanger (41), a pump (42), a cooler (43), an expansion vessel (44) mounted on the at least one frame (16), a cold liquid duct (45), and a hot liquid duct (46).

2. The mowing device of claim 1, wherein the current generator (32) produces several tens of kW, between approximately 15 kW and 50 kW.

3. The mowing device of claim 1, wherein the cooling is carried out by a glycolated fluid circuit and a cooler (43).

4. The mowing device of claim 1, wherein the electric motor (33) is implanted directly on the cutting/grinding equipment (20).

5. An agricultural machine (10) of the automotive type for the upkeep of roadsides, comprising the mowing device of claim 1.

6. The mowing device claim 1, wherein the current generator (32) is fitted on the frame (16), and is connected to a power take-off (18) of the automotive agricultural machine by means of a multiplier (31).

7. The mowing device of claim 1, wherein the current generator (32) produces several tens of kW, for between approximately 15 kW and 50 kW.

8. The mowing device of claim 1, wherein at least one of the current generator (32), the electric motor (33) and the variator (39) is cooled.

9. The mowing device of claim 8, wherein the cooling is carried out a coolant fluid.

10. The mowing device of claim 9, wherein the cooling is carried out by a glycolated fluid circuit and a cooler (43).

11. The mowing device of claim 1, wherein the current generator (32) produces several tens of kW, between approximately 25 kW and 40 kW.

* * * * *